(12) United States Patent
Hutter, III et al.

(10) Patent No.: US 8,006,361 B2
(45) Date of Patent: Aug. 30, 2011

(54) INSTALLATION TOOL FOR USE WITH A LINER SLEEVE ATTACHMENT

(75) Inventors: Charles G. Hutter, III, Carson City, NV (US); Barry L. Madson, Dayton, NV (US)

(73) Assignee: Physical Systems, Inc., Carson City, NV (US)

( * ) Notice: Subject to any disclaimer, the term of this patent is extended or adjusted under 35 U.S.C. 154(b) by 1289 days.

(21) Appl. No.: 11/612,049

(22) Filed: Dec. 18, 2006

(65) Prior Publication Data

US 2007/0186411 A1 Aug. 16, 2007

Related U.S. Application Data

(60) Provisional application No. 60/766,840, filed on Feb. 14, 2006.

(51) Int. Cl.
*B23P 11/00* (2006.01)
*B23P 15/26* (2006.01)
*F16B 37/04* (2006.01)
*B23P 19/04* (2006.01)

(52) U.S. Cl. ............ 29/243.518; 29/432.1; 29/243.526; 29/726; 411/177

(58) Field of Classification Search ............ 29/243.518, 29/243.526, 432.1, 726; 411/177
See application file for complete search history.

(56) References Cited

U.S. PATENT DOCUMENTS

| | | | | |
|---|---|---|---|---|
| 3,367,011 A | * | 2/1968 | Sipher | 29/726 |
| 3,645,125 A | * | 2/1972 | Summerlin | 29/243.522 |
| 3,774,437 A | * | 11/1973 | Young | 29/243.526 |
| 3,996,784 A | * | 12/1976 | Champoux et al. | 29/517 |
| 4,124,928 A | * | 11/1978 | Stark | 29/235 |
| 4,213,239 A | * | 7/1980 | Filer | 29/726 |
| 4,248,077 A | * | 2/1981 | Gregory | 29/243.524 |
| 4,732,518 A | | 3/1988 | Toosky | |
| 4,959,899 A | * | 10/1990 | Martin | 29/726 |
| 5,013,391 A | * | 5/1991 | Hutter et al. | 156/578 |
| 5,425,164 A | * | 6/1995 | El Dessouky | 29/243.524 |
| 5,704,747 A | | 1/1998 | Hutter, III et al. | |
| 7,698,794 B2 | * | 4/2010 | Cobzaru | 29/256 |

\* cited by examiner

*Primary Examiner* — Lee D Wilson
*Assistant Examiner* — Alvin J Grant
(74) *Attorney, Agent, or Firm* — Lowry Blixseth LLP; Stuart O. Lowry; Scott M. Lowry

(57) ABSTRACT

An installation tool for use with a liner sleeve attachment, such as a nutplate assembly for mounting onto a substrate blind side as disclosed in U.S. Pat. No. 5,704,747. The installation tool includes retractable grip jaws for gripping and pulling a fixture pin protruding from the attachment, for initially advancing a tapered tool nose piece into deforming engagement with an attachment liner sleeve leading end to flare and/or expand the liner sleeve to lock the liner sleeve onto the substrate. Continued pulling action exerts a sufficient force to collapse a fixture pin head and thereby permit pull-removal of the fixture pin from the attachment. The nose piece is carried by a retractable inner housing normally retained in an advanced position for deforming the liner sleeve, and thereafter movable to a retracted position spaced from the liner sleeve to accommodate substantially unobstructed fixture pin separation from the attachment.

18 Claims, 9 Drawing Sheets

INSTALLATION TOOL FOR USE WITH A LINER SLEEVE ATTACHMENT

BACKGROUND OF THE INVENTION

This invention relates generally to an improved installation tool for use with a liner sleeve attachment or attachment assembly, such as an adhesive bonded nutplate attachment assembly of the type described in U.S. Pat. No. 5,704,747, which is incorporated by reference herein. More particularly, the installation tool of the present invention is designed for expanding and/or flared deformation of a leading end of a liner sleeve seated with an opening formed in a substrate, for mechanically clamping and locking the liner sleeve onto the substrate, and for thereafter pulling a fixture pin from the attachment for substantially complete removal therefrom without interference.

U.S. Pat. No. 5,704,747 discloses an attachment or attachment assembly such as a nutplate assembly adapted for fixation onto the blind side of a selected substrate, such as onto a frame or panel used in an aerospace, marine or automotive application, wherein the attachment comprises or includes a liner sleeve for seated placement within an opening formed in the substrate. A fixture pin has an enlarged head engaged with the liner sleeve and an elongated mandrel projecting from the pin head and through the liner sleeve for access at a front side of the substrate. An installation tool is disclosed and includes pulling jaws for engaging and pulling the fixture pin mandrel. Initially, such pulling action displaces a tapered conical nose piece on the installation tool into deforming engagement with a leading end of the liner sleeve for flaring and locking the liner sleeve onto the substrate. Thereafter, continued pulling action causes the head on the fixture pin to collapse so that the fixture pin can be pulled forwardly and removed from the attachment. Such mechanical locking of the attachment onto the substrate by means of the liner sleeve may be supplemented by an adhesive bonding agent. In the case of a nutplate assembly, following fixture pin removal, a threaded nut is supported at the substrate blind side in substantial alignment with the substrate opening, for subsequent threaded engagement with a fastener such as a screw or bolt extending rearwardly through the substrate opening.

One disadvantage associated with blind side-mounted attachments and the related installation tool as described above is that the tapered nose piece on the installation tool can obstruct and interfere with complete and rapid pull-out separation of the fixture pin from the liner sleeve, following flared deformation of the liner sleeve leading end. That is, the tapered nose piece tends to remain seated against the flared liner sleeve to provide a stable support structure against which the pulling force may react to withdraw the fixture pin from the installed attachment. Accordingly, the fixture pin can be pulled forwardly until the collapsed head thereof engages the tapered nose piece seated on the liner sleeve, at which point the nose piece blocks further pull-out displacement of the fixture pin from the liner sleeve. At this point, the tool operator must manually pull the tool away from the substrate to achieve final fixture pin separation. Such step may require a significant exertion of manual effort, and, in some instances, may require the installation tool to be jockeyed or pivoted from side-to-side in order to extract the fixture pin head from the liner sleeve. Such side-to-side movements may undesirably cause surface damage to the installed liner sleeve.

A similar problem arises in connection with so-called cold working sleeve attachments of the type having a flanged rear or blind side end in combination with a tubular cold working liner sleeve projecting from the flanged rear end into a substrate opening. Such attachments are designed to receive a fixture pin having a relatively enlarged rear-end head engaging the flanged rear end of the sleeve, and an elongated narrow mandrel projecting forwardly from the head through the sleeve and substrate for access at a front side of the substrate. An installation tool includes pulling jaws for grasping and pulling the front side accessible mandrel so that the head urges the rear-end flange into firm seated engagement with the blind side of the substrate. Further pulling action carries the enlarged head of the fixture pin forwardly through the tubular liner sleeve for expanding the sleeve into secure engagement with the substrate. In some designs, this sleeve expansion action additionally cold-works the substrate in the region of the substrate opening for enhanced strength. However, as the enlarged head of the fixture pin is pulled through the attachment sleeve, a nose of the installation tool can interfere with complete and rapid pull-out separation of the head from the liner sleeve. For one example of a cold working sleeve attachment of this general type, see U.S. Pat. No. 4,732,518.

There exists, therefore, a need for improvements in and to installation tools of the type used for installing a liner sleeve attachment within a substrate opening, wherein the improved installation tool is designed for quick, easy, and sequential flared locking and/or expansion of a liner sleeve for secure engagement with the substrate followed by complete and positive fixture pin separation from the installed attachment. The present invention fulfills these needs and provides further related advantages.

SUMMARY OF THE INVENTION

In accordance with the invention, an installation tool is provided for use in installing a liner sleeve attachment onto a substrate, such as a nutplate attachment assembly or the like having an expanded or flared liner sleeve for mounting onto a substrate as disclosed in U.S. Pat. No. 5,704,747, which is incorporated by reference herein. The improved installation tool includes retractable grip jaws for gripping and pulling a fixture pin protruding from the attachment, for initially advancing a conically tool nose piece into engagement with a leading end of a liner sleeve on the attachment to accommodate mechanical locking of the liner sleeve onto the substrate, and for thereafter retracting the nose piece from the liner sleeve while pulling the fixture pin from the attachment.

In one preferred form, the tool nose piece has a tapered geometry and is carried by an inner housing mounted within an outer housing for displacement between a first or advanced position for engaging and flaring the leading end of the liner sleeve, and a second or retracted position retracted from the liner sleeve to accommodate unobstructed pull-out separation of the fixture pin from the liner sleeve. The inner housing is mounted within the outer housing by means of a spring-loaded clutch which retains the nose piece in the first or advanced position for liner sleeve deformation, and thereafter releases in response to increased axial force applied by the grip jaws for displacement to the second position retracted from the liner sleeve as the fixture pin is pulled from the attachment. That is, the axial force required for deforming the liner sleeve is less than the release force of the spring-loaded clutch, wherein the clutch release force in turn is less than the force required to pull the fixture pin from the attachment.

In a preferred form, the spring-loaded clutch comprises a set of lock balls carried within a corresponding set of radially open lock ports formed in the outer housing. A clutch spring unit circumscribes the lock balls and lock ports for normally engaging and retaining the lock balls in positions protruding radially inwardly a short distance from said lock ports for engaging a tapered cam shoulder formed on the inner housing. When the axial force applied to the inner housing and nose piece carried thereby exceeds a predetermined magnitude, the clutch spring unit retracts relative to the lock balls to accommodate radially outward lock ball displacement sufficient to permit axial shifting of the inner housing relative to the outer housing. When this occurs, the nose piece and inner housing shift to the retracted position, and a leading end of the outer housing advances into landed engagement with the substrate to provide a stable support structure against which the pulling force may react to withdraw the fixture pin from the installed attachment.

Upon fixture pin removal from the substrate, the axial pulling force is released, and the installation tool is re-set with the inner housing and nose piece carried thereby re-set in the initial first or advanced position.

In one alternative preferred form of the invention, the tapered nose piece can be substituted by a non-tapered nose piece adapted to engage a leading end of a cold working liner sleeve within the substrate opening. The installation tool is adapted to engage and pull upon the fixture pin, which has a sufficiently enlarged rear-end head for initially seating a rear-end or blind side sleeve flange against a blind side of the substrate and is then pulled forwardly through the liner sleeve for expanding the liner sleeve within the substrate opening for secure fastened relation with the substrate. As the fixture pin head expands the liner sleeve, the non-tapered nose piece and inner housing of the installation tool shift rearwardly to the retracted position, and a leading end of the outer housing advances into landed engagement with the substrate to provide a stable support structure against which the pulling force may react to withdraw the fixture pin from the installed attachment.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
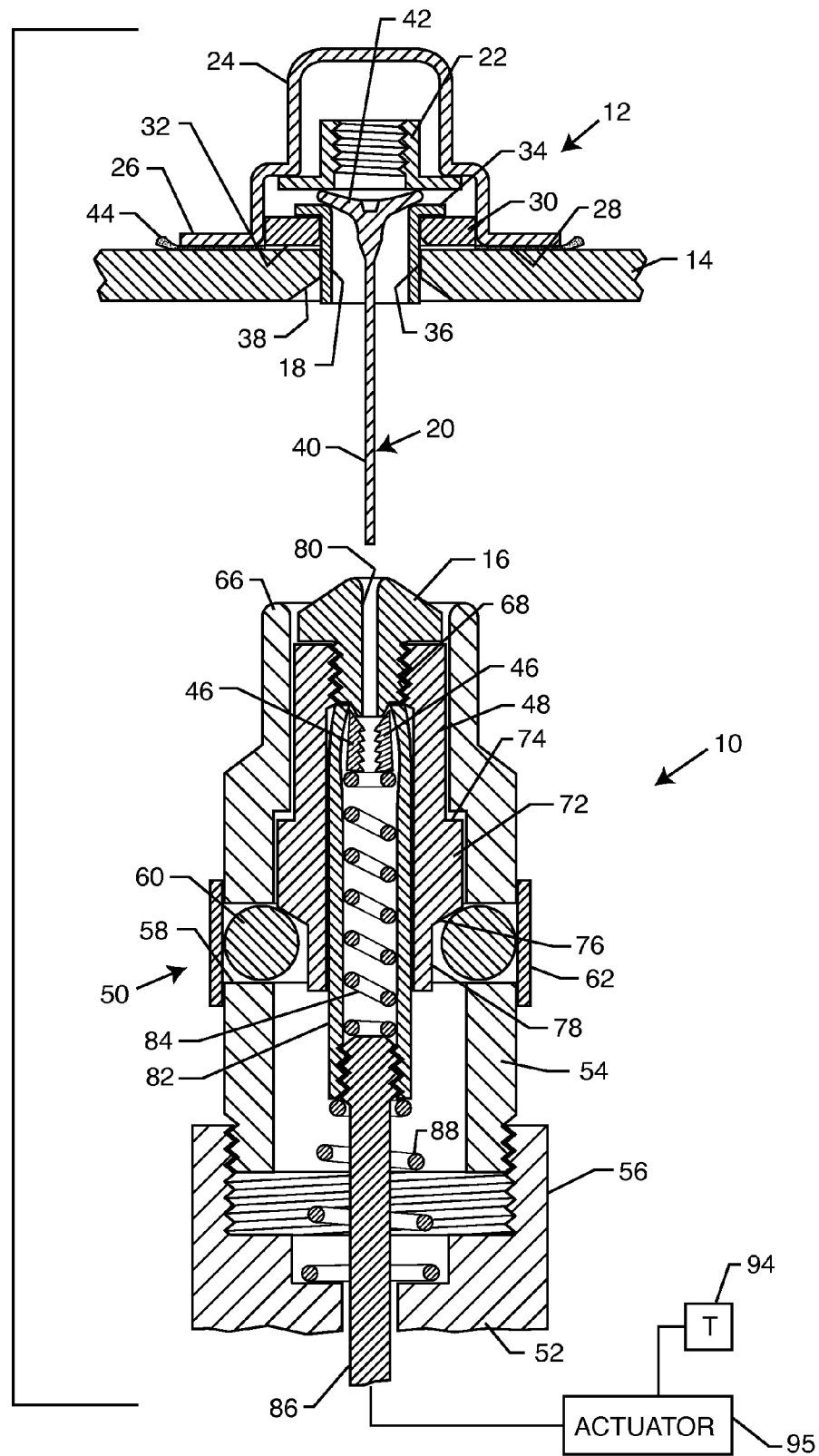
FIG. 1 is an exploded sectional view of a pulling tool in association with a flared liner sleeve attachment for mounting onto a blind side of a supporting substrate.

As shown in the exemplary drawings, an improved installation tool referred to generally in FIG. 1 by the reference numeral 10 is provided for use in installing a flared liner sleeve attachment 12 onto a substrate 14. The installation tool 10 includes a tapered nose piece 16 for engaging and flaring a leading end of a liner sleeve 18 forming a portion of the attachment 12, and for thereafter retracting the nose piece 16 from the liner sleeve 18 to permit complete and substantially unobstructed pull-out separation of a fixture pin 20 from the attachment.

The installation tool 10 of the present invention in particularly designed and adapted for use with a liner sleeve attachment 12 of the general type shown and described in U.S. Pat. No. 5,704,747, which is incorporated by reference herein. In this regard, the illustrative liner sleeve attachment 12 is particularly designed for use in a variety of aerospace, marine and automotive applications for supporting items such as electrical, pneumatic and/or hydraulic service lines and the like on a substrate, such as a supporting panel or hull or other frame component. In general, the attachment 12 may comprise a nutplate attachment or attachment assembly having an internally threaded nut 22 captured preferably in a manner accommodating minor axial and minor rotational floating movement, but without significant axial or rotational freedom, within a suitable retainer 24 shown with a dome-shaped geometry. The retainer 24 has a radially enlarged flange 26 defining a base surface 28 for adhesive bonded fixation onto a blind side of the substrate 14, as will be described in more detail. A base ring 30 is installed within an otherwise open end of the retainer 24 and also defines a base surface 32 substantially coplanar with the flange base surface 28 for adhesive securement to the substrate blind side.

The liner sleeve 18 comprises a cylindrical grommet having a radially enlarged rim 34 at one end thereof, wherein this enlarged rim 34 is shown captured axially between the base ring 30 and the nut 22. From the rim 34, the liner sleeve 18 extends axially through the base ring 30 to normally protrude in a forward direction a short distance beyond the ring base surface 32. As viewed best in FIGS. 1 and 2, the liner sleeve 18 has a size and shape for slide-fit reception from a rear or blind side of the substrate 14 through a substrate opening 36, with a leading end of the liner sleeve 18 terminating a short distance beyond a front side or frontal plane of the substrate 14. As shown, a shallow countersink 38 may be formed at the substrate front side in surrounding relation to the substrate opening 36.

The fixture pin 20 comprises an elongated element carried by the attachment 12 for use in attachment installation onto the substrate 14. The illustrative fixture pin 20 is formed from a material such as stainless steel or the like selected for controlled deformation in response to an applied pulling force. As shown, the fixture pin comprises an elongated narrow mandrel 40 having a radially enlarged head 42 at a rear end thereof, wherein the pin head 42 is interposed axially between the nut 22 and the rear-end rim 34 on the liner sleeve 18. The mandrel 40 extends axially from the head 42 through the liner sleeve 18, terminating a substantial distance beyond the liner sleeve leading end. The head 42 is preferably constructed with a radially projecting flange for controlled radial collapse in response to an applied pulling force of predetermined magnitude, as will be described in more detail.

Figure 2:
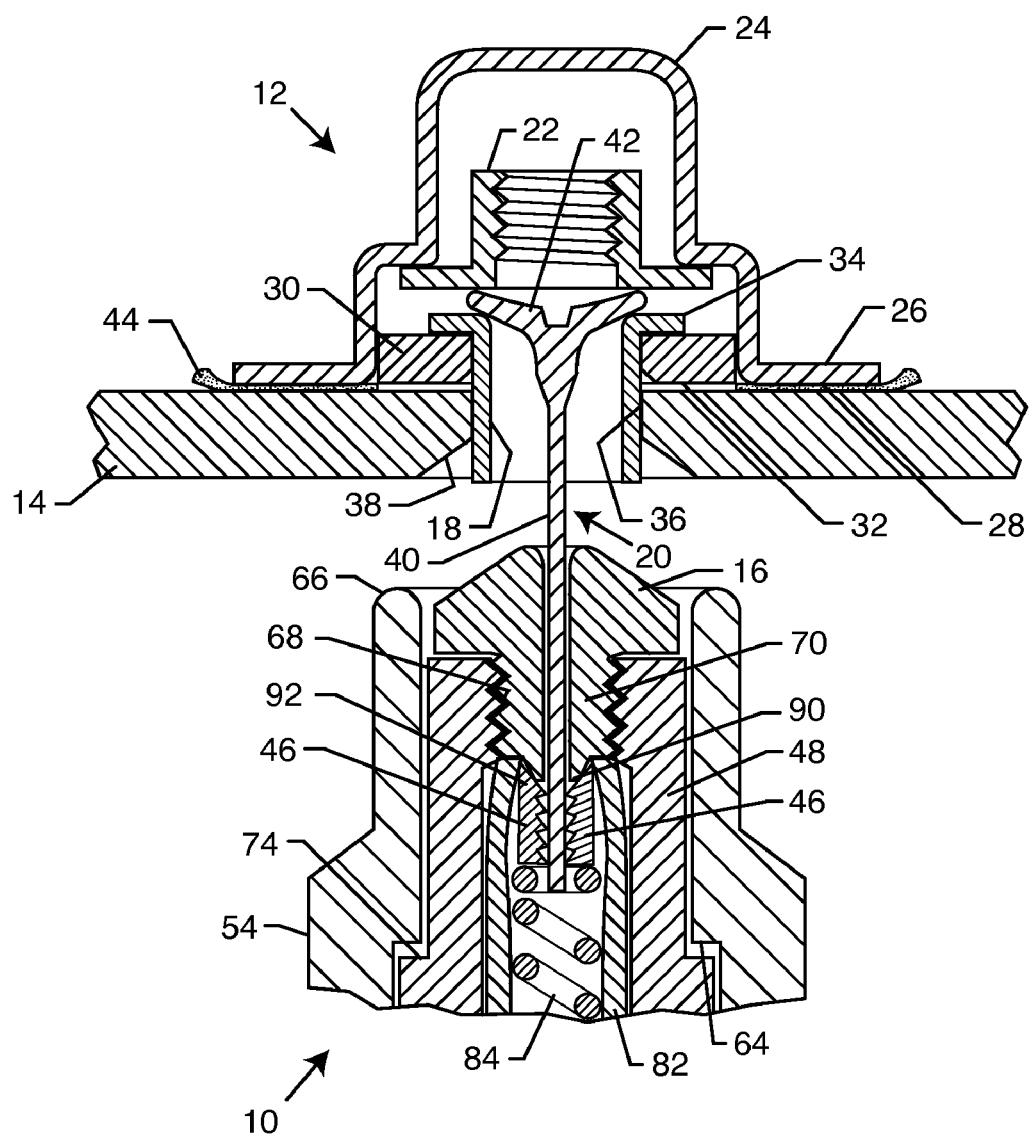
FIG. 2 is an enlarged and fragmented sectional view similar to a portion of FIG. 1, and showing a nose end of the pulling tool including grip jaws in initial engagement with an elongated fixture pin projecting from the flared sleeve attachment.

In use, a selected adhesive bonding agent 44 is applied to the base surfaces 28, 32 of the retainer flange 26 and the base ring 30, followed by seated placement of the attachment 12 against the substrate blind side with the liner sleeve 18 fitted into the substrate opening 36, as viewed in FIG. 1 and 2. In this position, the installation tool 10 of the present invention is used to grasp and pull the mandrel 40 of the fixture pin 20, for sequential flared deformation of the liner sleeve leading end into mechanically locked engagement with the substrate 14, followed by substantially unobstructed pull-out separation of the fixture pin 20 from the attachment, as viewed in FIG. 6. In this configuration, the attachment 12 is securely mounted onto the substrate 14 by a combination of the mechanically locked liner sleeve 18 and the adhesive bonding agent 44, and the nut 22 is supported at the substrate blind side for threaded engagement by a suitable fastener (not shown) passed from the front side through the substrate opening 36 and liner sleeve 18 into engagement with the nut.

Figure 4:
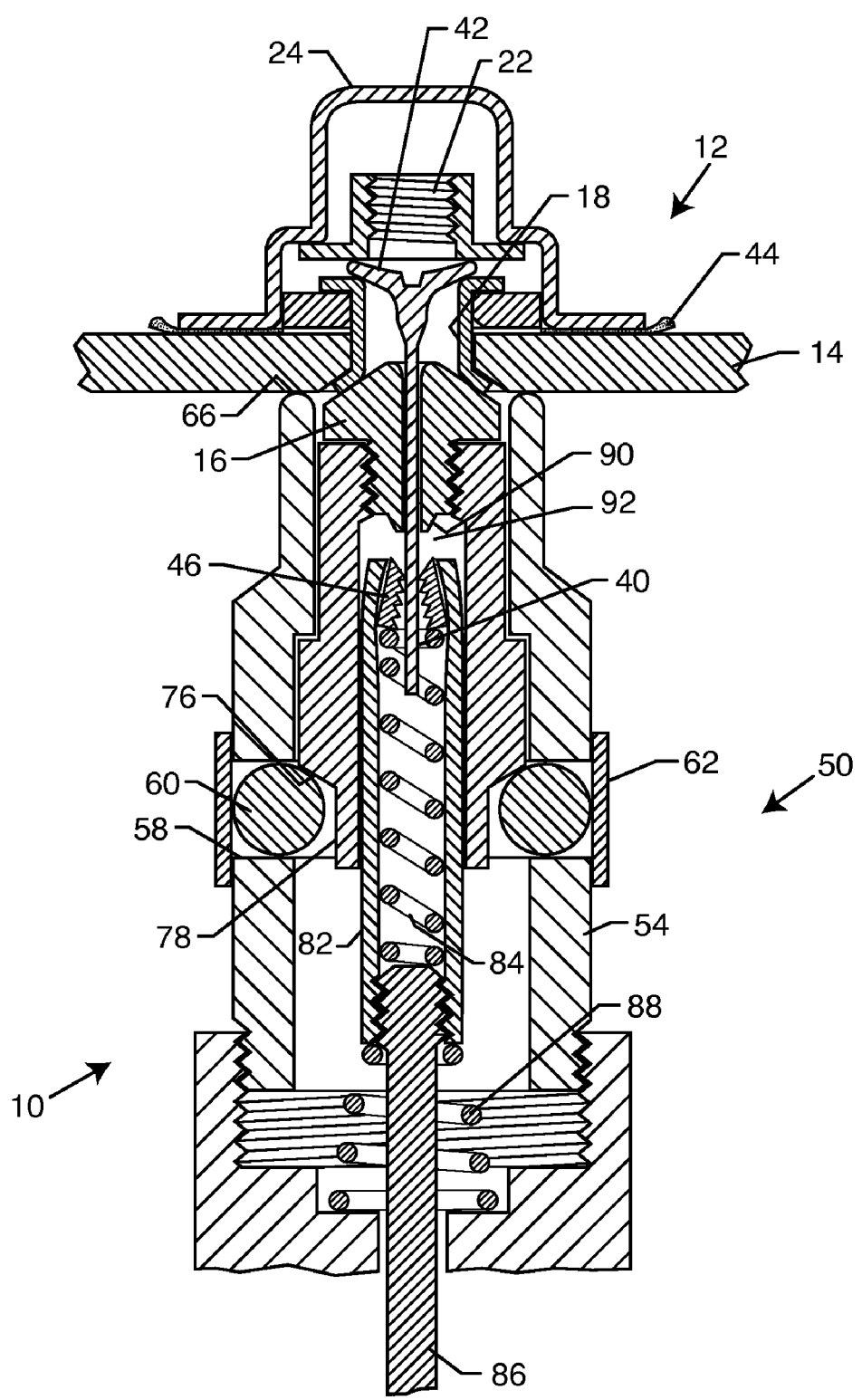
FIG. 4 is a further sectional view similar to FIGS. 1-3, and illustrating the pulling tool nose end in a first or advanced position for flared deformation of the leading edge of the liner sleeve, for lockingly engaging the liner sleeve onto the substrate.
Figure 5:
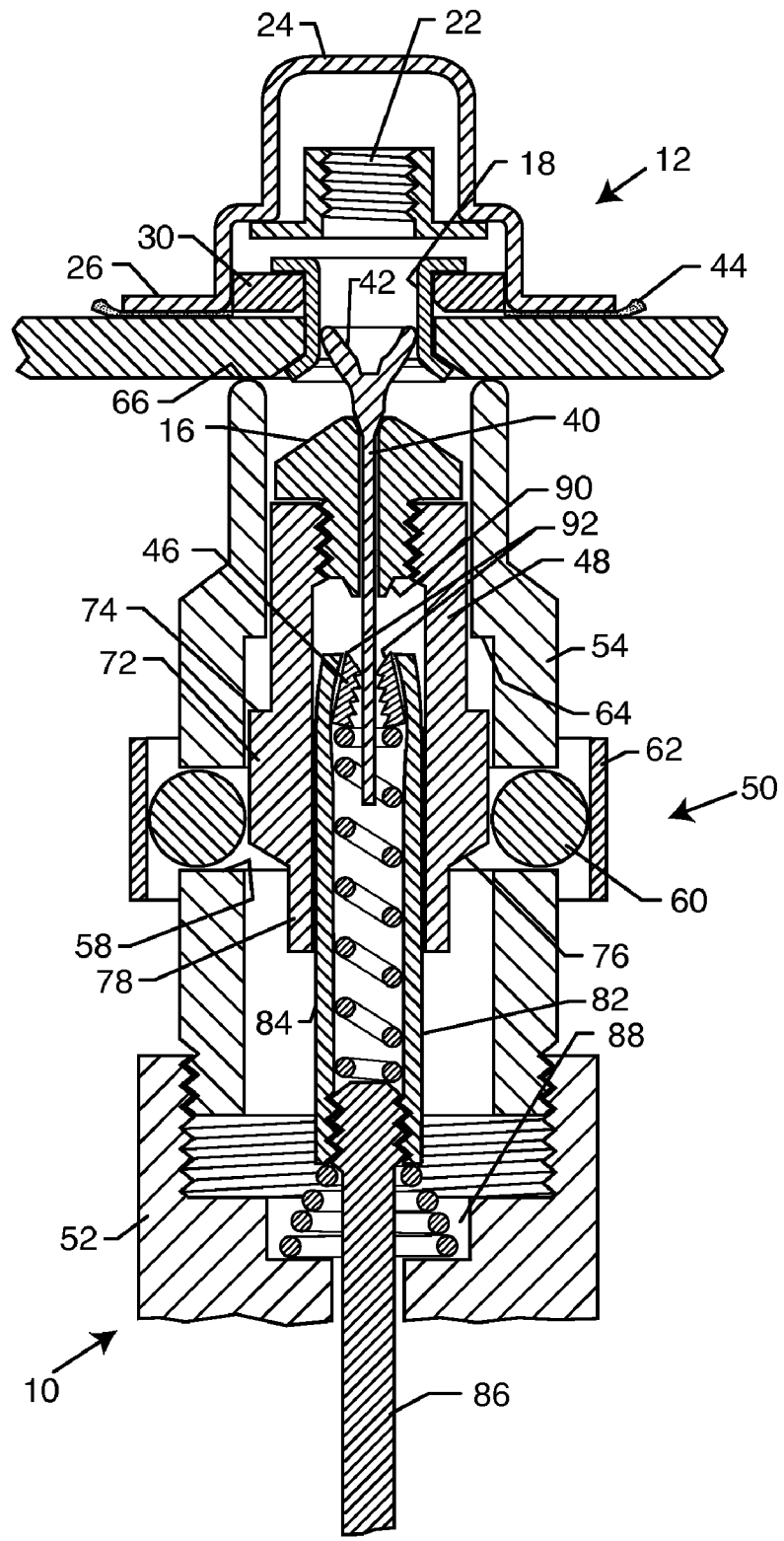
FIG. 5 is a sectional view similar to FIGS. 1-4, and showing further displacement of the pulling tool nose end to a retracted position for pulling the fixture pin from the attachment.
Figure 6:
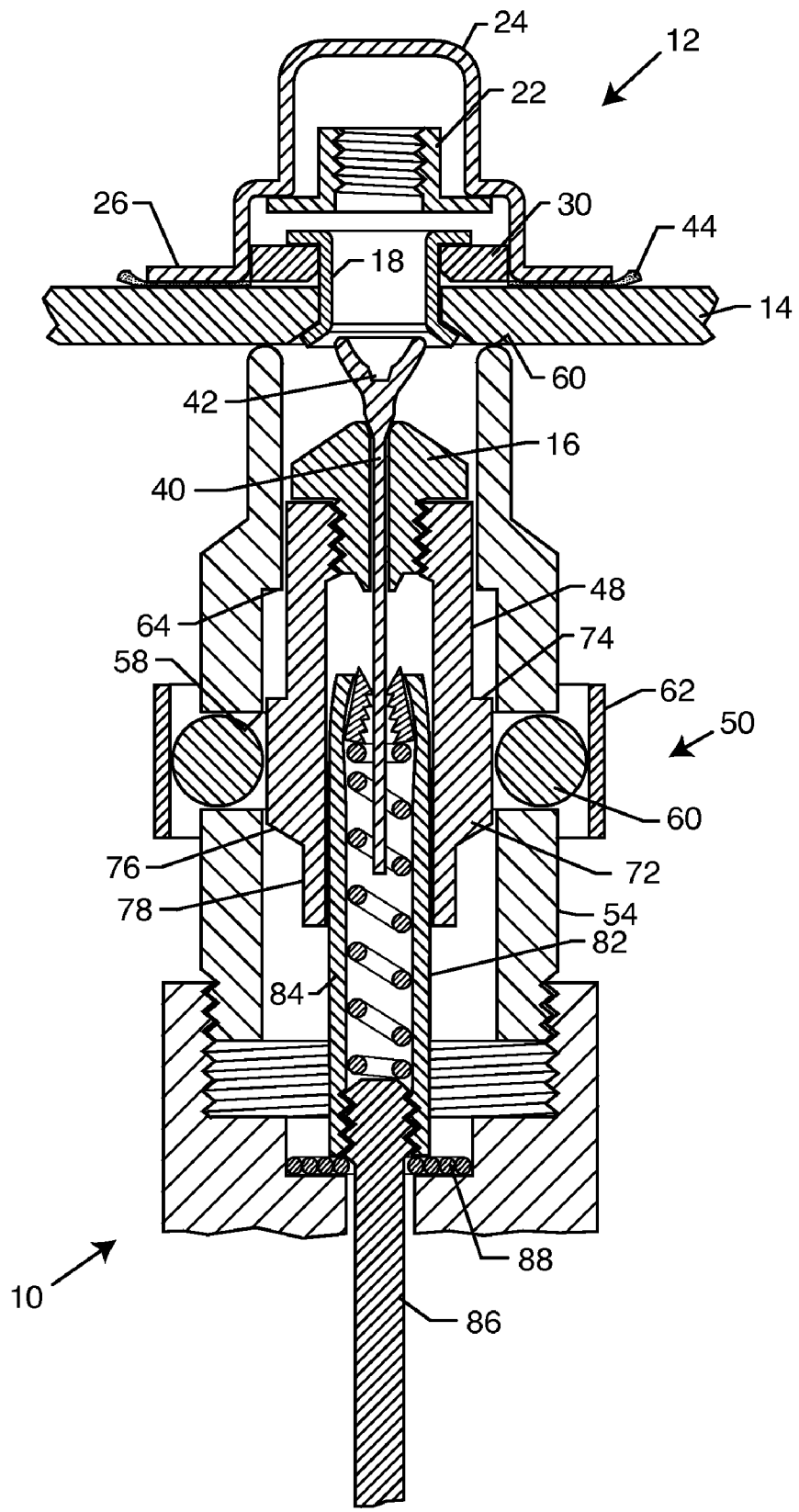
FIG. 6 is another sectional view similar to FIGS. 1-5, and depicting pull-out separation of the fixture pin from the attachment.
Figure 7:
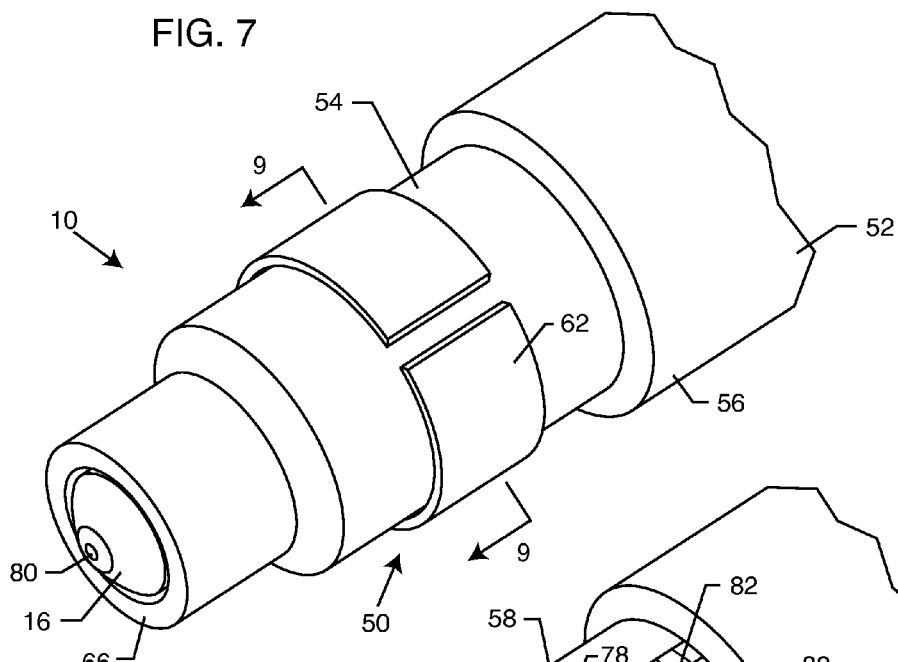
FIG. 7 is an enlarged and fragmented perspective view of a front end portion of the pulling tool.
Figure 8:
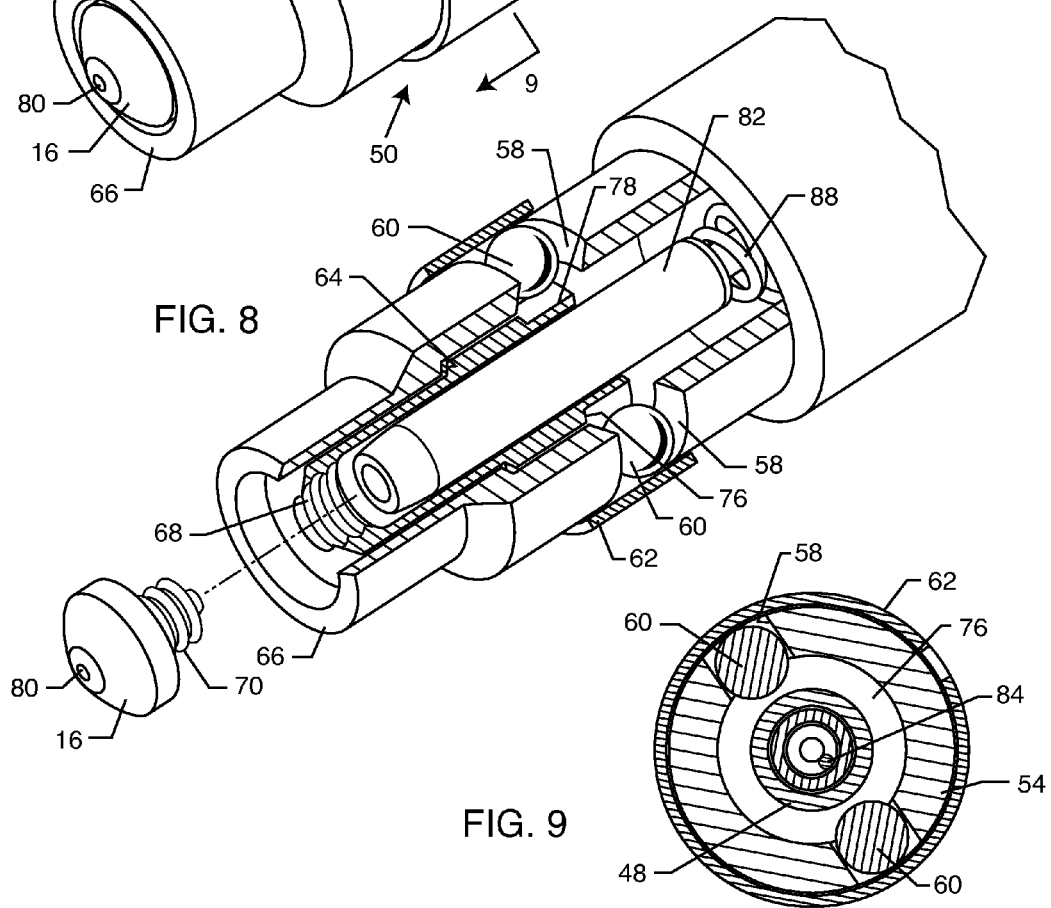
FIG. 8 is an enlarged and fragmented perspective view similar to FIG. 7, with portions broken away to illustrate internal construction details of the pulling tool.
Figure 9:
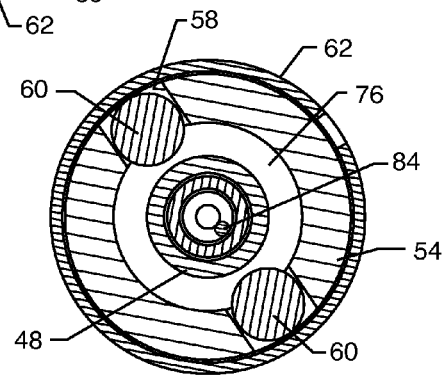
FIG. 9 is a transverse sectional view taken generally on the line 9-9 of FIG. 7.

The installation tool 10 generally comprises the nose piece 16 having a conically tapered leading end for engaging and deforming the leading end of the liner sleeve 18, in combination with a set of pulling jaws 46 for gripping the elongated fixture pin mandrel 40 to apply a substantial pulling force thereto. In accordance with one important aspect of the invention, the tool nose piece 16 is carried by an inner housing 48 for movement between a normal first or advanced position for engaging and flaring the liner sleeve 18 (FIGS. 3-4), and a second or retracted position spaced from the liner sleeve 18 following deformation thereof to accommodate unobstructed pull-out removal of the fixture pin 20 (FIGS. 5-6). A spring-loaded clutch unit 50 controls movement of the inner housing 48 and nose piece 16 from the advanced position to the retracted position, in response to the magnitude of the applied pulling force.

More particularly, the installation tool 10 comprises a main tool body 52 having an outer housing 54 of generally cylindrical shape protruding outwardly therefrom, as by threaded coupling of the outer housing 54 into an internally threaded collar 56 on the tool body 52. The outer housing 54 extends forwardly with a generally cylindrical shape, interrupted by a plurality of radially open lock ports 58 (FIGS. 1, 3-6 and 8-9) formed therein at a common axial location. These lock ports 58 respectively carry lock balls 60 each having a diametric size somewhat greater than the radial thickness of the outer housing 54. These lock balls 60 and associated lock ports 58 comprise a portion of the spring clutch unit 50, which additionally comprises a split band or strap spring 62 carried circumferentially about the lock ports 58.

Accordingly, in a normal contracted configuration, the clutch band spring 62 applies a radially inwardly directed force to each of the lock balls 60, for urging the lock balls 60 to radially inward positions protruding at least slightly beyond an inner diameter surface of the outer housing 54 for engaging the inner housing 48. From the spring clutch unit 50, the outer housing 54 extends further forwardly, and steps down to a slightly smaller diametric size, thereby defining a rearwardly presented, internally stepped shoulder 64 (FIG. 2). The outer housing 54 terminates in a forward or leading end 66 of generally annular shape with a diametric size at least slightly greater than the diametric size of the counterbore 38 formed at the front side of the substrate 14.

The inner housing 48 is slidably carried within the outer housing 54. A front end of the inner housing 48 is sized and shaped for slide-fit reception into the narrower forward portion of the outer housing 54, and includes a coaxially formed internal thread 68 for receiving a rearwardly protruding externally threaded plug 70 on the rear end of the nose piece 16. The inner housing 48 further defines a rearward cam segment 72 (FIG. 1) defining a forwardly presented radially enlarged shoulder 74 for abutting engagement with the internal stepped shoulder 64 of the outer housing 54, and a rearwardly presented cam surface 76 which tapers axially rearwardly and radially inwardly from the cam segment 74 to a narrower-diameter rear-end land 78 on the inner housing 48.

The land 78 on the inner housing 48 is diametrically sized for accommodating normal radially inward displacement of the lock balls 60 to protrude inwardly beyond the inner diameter of the outer housing 54, with the cam surface 76 being normally engaged axially by the lock balls. The taper defined by the cam surface 76 accommodates relative displacement between the inner and outer housings 48, 54 upon application of a sufficient rearwardly directed axial force on the inner housing 48 to displace the lock balls 60 radially outwardly against the clutch spring 62.

The nose piece 16 has a tapered conical frontal profile, extending axially rearwardly and radially outwardly from a central apex disposed generally on a central axis of the nose piece 16 and defining a coaxially formed central bore 80. This bore 80 is sized for slide-fit reception of the fixture pin mandrel 40.

Figure 3:
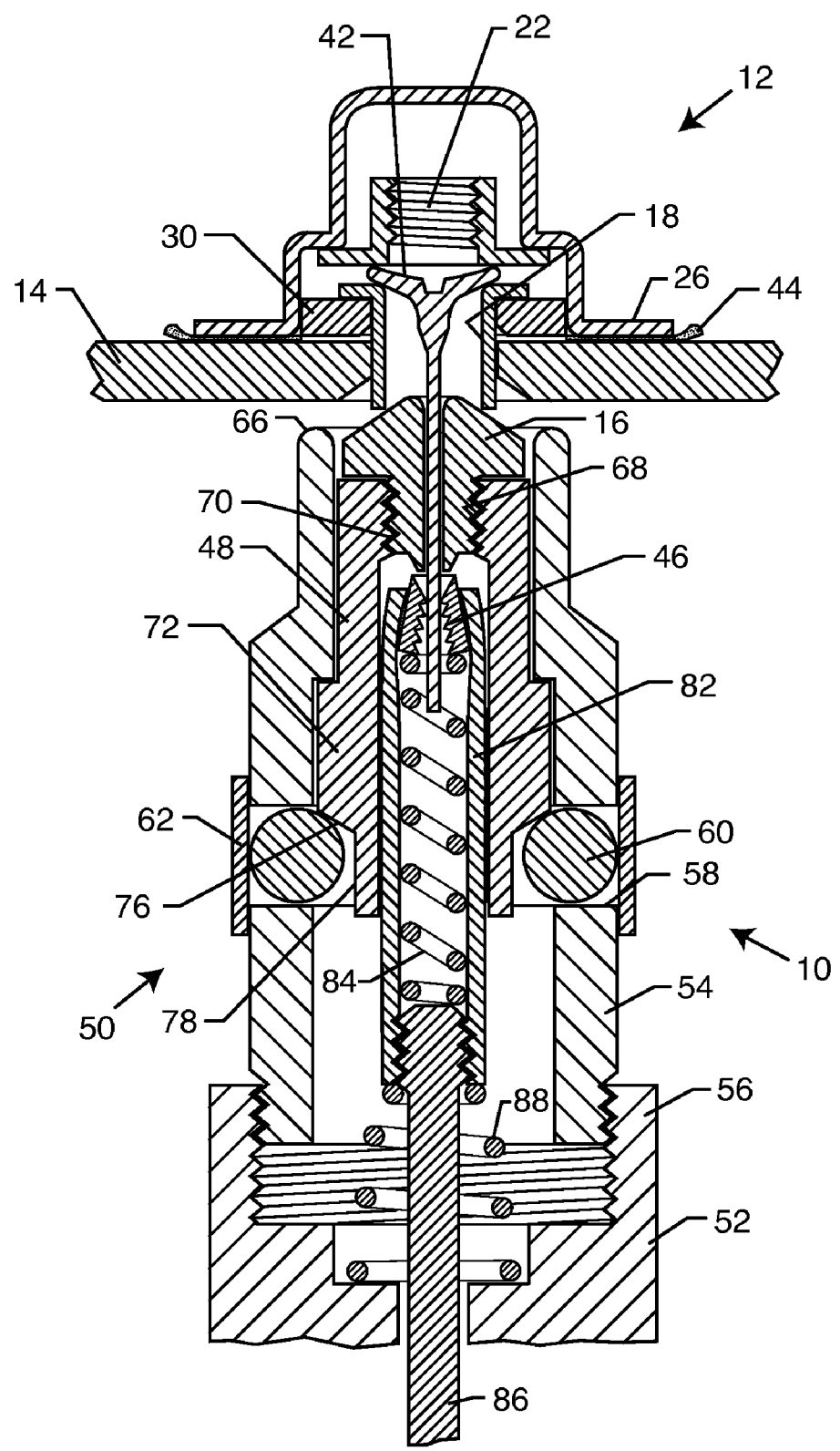
FIG. 3 is a sectional view similar to FIGS. 1 and 2, and depicting initial actuation of the pulling tool and displacement of the nose end thereof into initial engagement with a leading end of a liner sleeve forming a portion of the attachment.

As viewed best in FIGS. 2 and 3, the pulling jaws 46 are carried within a pulling sleeve 82 and have a size and shape for slide-fit reception into a rear end of the inner housing 48, for gripping the fixture pin mandrel 40 fitted through the nose piece 16. These pulling jaws 46 comprise a plurality of internally serrated jaw components captured within a front end of the pulling sleeve 82 which has a radially narrowing tapered shape. A jaw spring 84 reacts between a rear end of the jaws 46 and an actuator stem 86 secured as by threading to a rear end of the pulling sleeve 82, for biasing the jaws 46 toward the sleeve front end as shown. A re-set spring 88 normally biases the pulling sleeve 82, and the jaw components 46 carried therein, toward a forward or advanced position, with the jaws 46 butted against the rear end of the plug 70 on the nose piece 16. In this regard, the plug rear end defines a truncated tapered conical cam 90 (shown best in FIG. 2) for engaging and slightly spreading the tapered leading ends 92 of the jaw components 46, thereby facilitating slide-fit reception of the fixture pin mandrel 40 into the jaws.

With this construction, the narrow mandrel 40 of the fixture pin 20 is slidably received through the nose piece 16 and the pulling jaws 46, wherein the internally serrated jaws accommodate smooth one-way slide-fit reception of the mandrel 40 but securely grip the mandrel 40 for normally preventing withdrawal therefrom. In this position, the installation tool 10 can be actuated as by manipulating an appropriate trigger 94 (FIG. 1) for operating a suitable actuator 95 for hydraulically or pneumatically retracting the actuator stem 86 and the pulling sleeve 82 with jaw components 46 therein, for purposes of applying a substantial pulling force to the fixture pin 20. Initially, this pulling force results in forward or advancing displacement of the nose piece 16 (disposed in the first or advanced position advanced a short distance beyond the leading end 66 of the outer housing 54) into engagement with the liner sleeve 18, thereby deforming the leading end of the liner sleeve 18 into a flared shape (FIGS. 3-4). As a result, the liner sleeve 18 is mechanically clamped and locked onto the substrate 14 with the flared leading end portion of the liner sleeve 18 seated securely within the countersink 38 at the front side of the substrate 14. Importantly, the radially inward force applied by the clutch spring 62 to the lock balls 60, for purposes of maintaining the inner housing 48 in the first or advanced position relative to the outer housing 54, exceeds the deformation force required to flare the leading end of the liner sleeve 18.

However, application of a continued and increased pulling force to the fixture pin mandrel 40, following liner sleeve leading end deformation, exceeds the radially inward force applied by the clutch band spring 62. That is, the cam surface 76 on the inner housing 48 engages the lock balls 60 and forces the lock balls to displace radially outwardly a sufficient distance, expanding the clutch band spring 62 as viewed in FIGS. 5-6, to permit rearward displacement of the inner housing 48 within the outer housing 54. Such rearward inner housing displacement also draws the nose piece 16 rearwardly from and into spaced relation with the now-flared leading end of the liner sleeve 18 (FIG. 5), and substantially concurrently causes the leading end 66 of the outer housing 54 to engage and seat firmly against the substrate 14 as the fixture pin head 42 collapses to permit fixture pin removal from the attachment. In this configuration, with the nose piece 16 in the second or retracted position spaced a short distance rearwardly from the leading end 66 of the outer housing 54, further rearward displacement of the fixture pin mandrel 40 effectively pulls and removes the fixture pin 20 from the attachment 12 (FIG. 6), as the nose piece 16 is further displaced from the flared liner sleeve 18 so that the nose piece does not obstruct or interfere with fixture pin removal.

As soon as the fixture pin is completely separated from the liner sleeve 18 (FIG. 6), the installation tool 10 is quickly and easily separated from the substrate 14 and attachment 12, and the trigger 94 can be released to interrupt the retraction force applied to the actuator stem 86. In this configuration, the re-set spring 88 returns the pulling sleeve 82 and associated jaw components 46 toward the forwardmost or uppermost position as viewed in FIGS. 1 and 2, where the tapered leading ends 92 of the grip jaws 46 engage the tapered conical cam 90 on the plug 70 to release the mandrel 40. The removed fixture pin 20 can then be manually removed from the tool 10, and the tool 10 is ready for use with a subsequent attachment 12.

Figure 10:
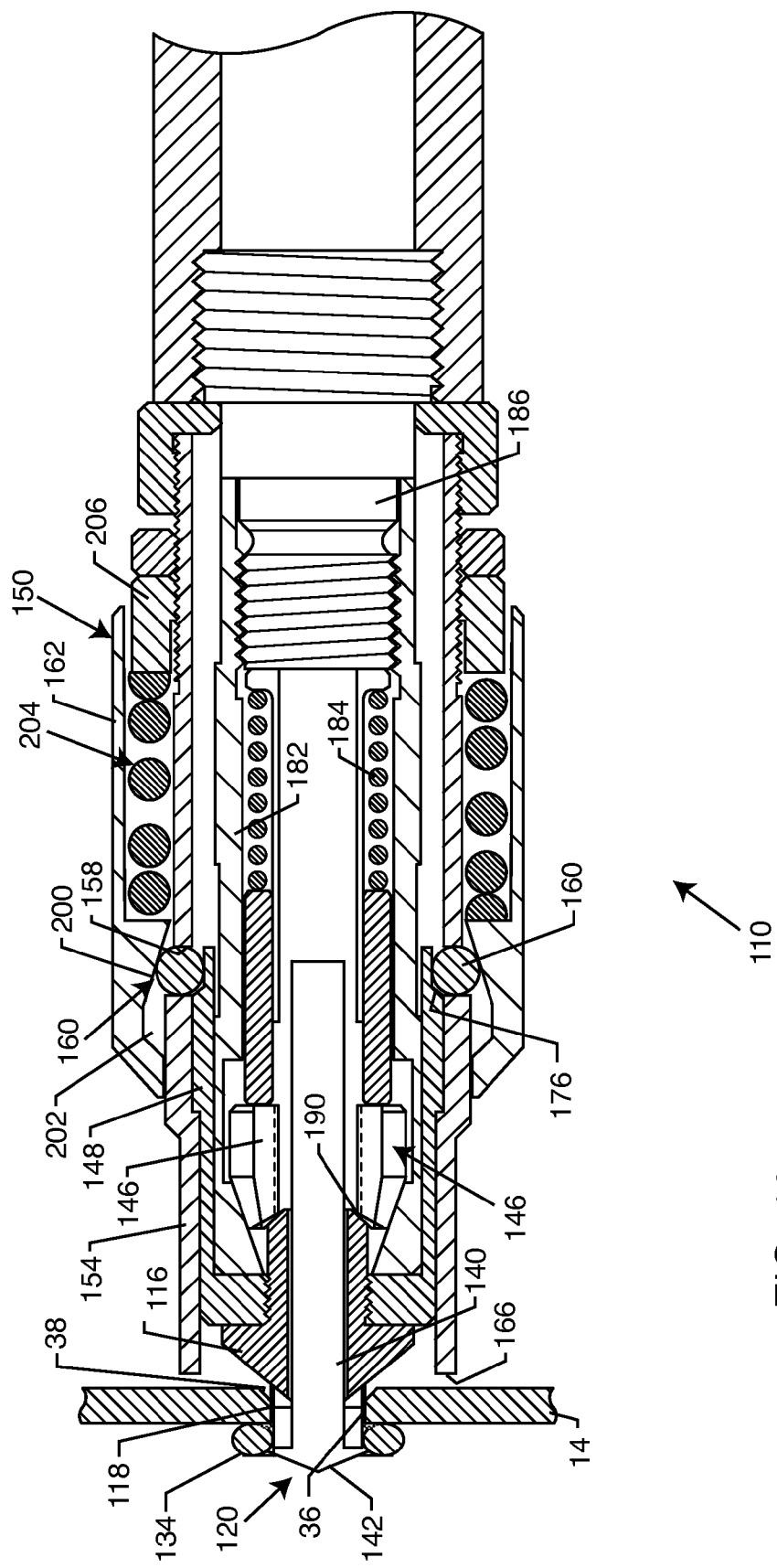
FIG. 10 is an enlarged and fragmented sectional view similar to FIGS. 1-6, depicting one alternative preferred form of the invention.
Figure 11:
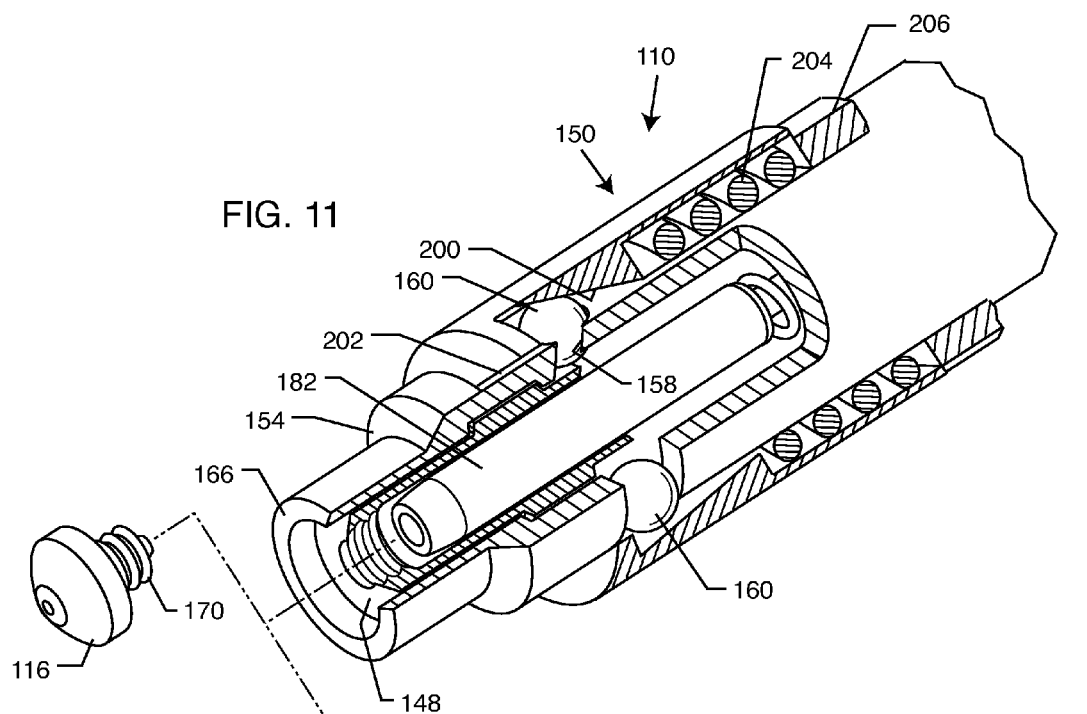
FIG. 11 is an enlarged and fragmented perspective view of the tool embodiment depicted in FIG. 10, with portions broken away to illustrate internal construction details, and further showing alternative mounting of a tapered nose piece for use with a flared liner sleeve attachment and a non-tapered nose piece for use with a cold working liner sleeve attachment.

FIGS. 10 and 11 depict an alternative preferred form of the installation tool of the present invention, wherein components corresponding in structure and/or function with those previously shown and described in connection with the embodiment depicted in FIGS. 1-9 are identified by common reference numerals increased by 100. As shown, the modified installation tool 110 incorporates a modified clutch unit 150 for controlling movement of an inner housing 148 relative to an outer housing 154.

More particularly, the installation tool 110 shown in FIGS. 10-11 is designed for gripping and pulling an elongated narrow mandrel 140 of a fixture pin 120 having an enlarged head 142 initially carried at a rear end of a liner sleeve 118 fitted into an opening 36 in a substrate 14. As shown, the liner sleeve 118 includes a rear-end rim or flange 134 abutting the rear end or blind side of the substrate 14, with the sleeve 118 extending forwardly into the substrate opening 36 which includes a shallow countersink 38 at the front or accessible side thereof. The liner sleeve 118 may form a portion of a nutplate attachment or nutplate assembly, as previously shown and described with respect to FIGS. 1-9. Alternately, persons skilled in the art will appreciate that the liner sleeve 118 may comprise a separate component adapted for installation onto the substrate 14 to line and thereby reinforce the substrate opening 36. In either case, the liner sleeve 118 is adapted for mechanical attachment to the substrate 14 as by flaring the leading end thereof within the countersink 38, and/or by radially expanding the liner sleeve 118 into secure binding engagement within the substrate opening 36. In the case of radially expanded attachment, a portion of the substrate 14 in the region defining and/or lining the substrate opening 36 can be cold-worked for improved strength properties, as disclosed in U.S. Pat. No. 4,732,518.

The modified installation tool 110 is shown to include a tapered nose piece 116 carried at the leading end of the inner housing 148 for slide-fit reception of the fixture pin mandrel 140 into gripped engagement with a set of pulling jaws 146. As in the prior-described embodiment, these pulling jaws 146 are urged forwardly within a pulling sleeve 182 by a jaw spring 184 toward normal seated contact with a conical cam 190 at the trailing end of the nose piece 116, for normally supporting the jaws 146 in a partially opened or partially separated configuration for slide-fit reception of the mandrel 140.

When the installation tool 110 is actuated, an actuator stem 186 is retracted to apply a pulling force via the jaws 146 to the fixture pin mandrel 140. Initially, this results in advancement of the tapered nose piece 116 into engagement with a leading end of the liner sleeve 118 (as shown in FIG. 10) for flared sleeve deformation within the associated countersink 38 in the substrate 14. In this initial position, a leading end 166 of the outer housing 154 is spaced at least slightly from the substrate 14.

Further application of pulling force by the actuator stem 186 results in an increased force that over-rides the modified clutch unit 150 in a manner causing the inner housing 148 to shift rearwardly within the outer housing 154, in the same manner as previously described with respect to FIG. 1-9. The modified clutch unit 150 is shown to include the array of lock balls 160 carried by the outer housing 154 within respective lock ports 158, wherein these lock balls 160 are initially and normally urged radially inwardly into contact with a cam surface 176 on the inner housing 148 for retaining the inner housing 148 in the first or advanced position.

In the modified form as shown in FIGS. 10-11, the clutch unit 150 comprises a clutch sleeve 162 slidably carried about the outer housing 154 and defining an internal cam surface 200 disposed at a trailing end of a radially enlarged cavity 202. A clutch spring 204 reacts against a base collar 206 on the outer housing 154 for normally urging the clutch sleeve 162 forwardly in a manner normally causing the internal cam surface 200 to bear against the lock balls 160, and thereby force the lock balls 160 radially inwardly to retain the inner housing 148 in the first or advanced position (as shown in FIG. 10). However, as the pulling force applied by the actuator stem 186 exceeds the force applied by the clutch spring 204, the cam surface 176 on the inner housing 148 forces the lock balls 160 radially outwardly against the clutch sleeve cam surface 200, thereby forcing the clutch sleeve 162 to shift rearwardly against the clutch spring 204. This displaces the enlarged cavity 202 into axial alignment with the lock balls 160, and thus permits the lock balls 160 to shift radially outwardly and release the inner housing 148 for displacement to the retracted position within the outer housing 154.

Shifting of the inner housing 148 to the retracted position is accompanied by initial advancement of the outer housing leading end 166 into bearing engagement with the substrate 14, and separation of the nose piece 116 from the liner sleeve 118. As the pulling force continues, the head 142 of the fixture pin 120 is pulled through the liner sleeve 118 and separated therefrom, without interference by the nose piece 116. Conveniently, the specific force setting at which this shifting movement of the inner housing 148 takes places can be calibrated by setting the force applied by the clutch spring 204. The base collar 206 is threaded onto the outer housing 154, and can be adjustably positioned axially along the outer housing to increase or decrease the applied clutch spring force, as desired.

Figure 12:
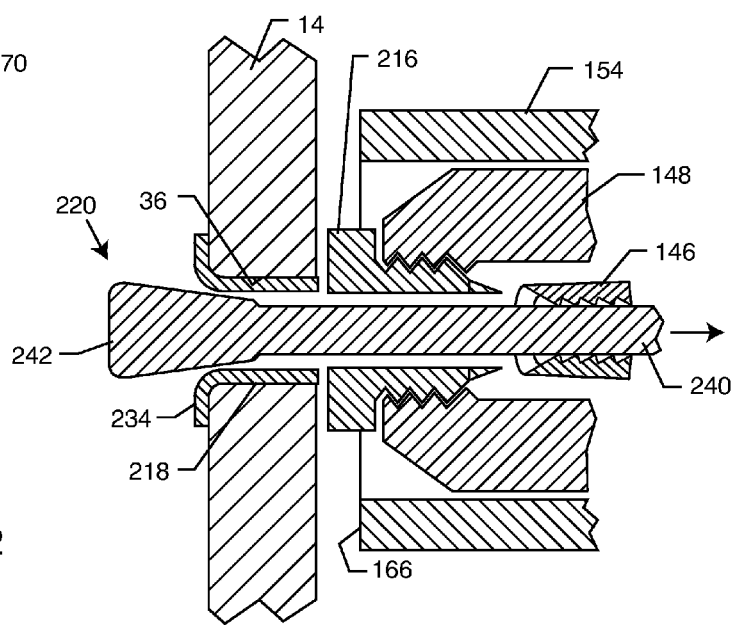
FIG. 12 is an enlarged and fragmented perspective view showing use of the alternative embodiment of FIGS. 10-11 with the non-tapered nose piece for expanding a cold working liner sleeve attachment.

FIGS. 11-12 illustrate a variation of the modified installation tool 110 wherein the tapered nose piece 116 is replaced by a non-tapered nose piece 216 designed particularly for use with a so-called cold working liner sleeve 218 (FIG. 12). More particularly, the tapered nose piece 116 is shown with the rear-end threaded plug 170 for quick and easy thread-in assembly with the inner housing 148. Upon removal of the tapered nose piece 116, the non-tapered nose piece 216 having a similarly threaded rear-end plug 270 is assembled quickly and easily with the inner housing 148. This non-tapered nose piece 216 defines a forwardly presented flat or substantially planar face.

The installation tool 110, equipped with the non-tapered nose piece 216, is depicted in FIG. 12 for engaging and setting a cold working liner sleeve 218 of the general type shown and described in U.S. Pat. No. 4,732,518, which is incorporated by reference herein. The liner sleeve 218 extends at least partially into an opening 36 in a substrate 14, and includes a short rear-end or blind side flange or rim 234 engaged with the blind side of the substrate 14. A fixture pin 220 has an elongated narrow mandrel 240 projecting forwardly from an enlarged head 242 at a rear end thereof. Preferably, a leading end of the liner sleeve 218 terminates at or near the plane of the front or accessible side of the substrate 14.

In use, the fixture pin mandrel 240 is slidably engaged with the pulling jaws 146 of the installation tool 110, and a pulling force is then applied to the mandrel by means of the actuator stem 186 (not shown in FIG. 12). This pulling force initially causes the non-tapered nose piece 216 to land firmly against the front side of the substrate 14 to provide a stop (FIG. 12) for abutting the leading end of the liner sleeve 218 as the rear-end rim 234 is urged by the fixture pin head 242 into firm seated engagement with the blind side of the substrate 14. The non-tapered nose piece 216 remains in this initial position as the fixture pin head 242 is initially drawn into and partially through the liner sleeve 218, to expand the liner sleeve 218 into secure engagement with the substrate 14 within the substrate opening 36. During this initial phase, the non-tapered nose piece 216 prevent axial elongation of stretching of the liner sleeve 218. However, as the pulling force continues to increase, and as the fixture pin head 242 approaches the nose piece 216, the clutch unit 150 is springably set to permit shifting of the inner housing 148 from the advanced position to the retracted position, thereby separating the nose piece 216 from the liner sleeve 218 to permit rapid and complete pull-out separation of the head 242 without interference.

Although various embodiments and alternatives have been described in detail for purposes of illustration, various further modifications may be made without departing from the scope and spirit of the invention. For example, it will be understood that the installation tool of the present invention may be employed with a variety of different attachment configurations, with or without adhesive bonding, including a deformable liner sleeve and a removable fixture pin. Accordingly, no limitation on the invention is intended byway of the foregoing description and accompanying drawings, except as set forth in the appended claims.

What is claimed is:

1. An installation tool for securing a deformable liner sleeve within a substrate opening, and for substantially removing a fixture pin from the liner sleeve, said installation tool comprising:
    an outer housing defining a leading end;
    an inner housing slidably movable within said outer housing between an advanced position with a nose piece thereon advanced beyond said outer housing leading end, and a retracted position with said nose piece thereon retracted relative to said outer housing leading end;
    a clutch unit normally retaining said inner housing in said advanced position;
    grip means carried by said inner housing for engaging an elongated fixture pin mandrel protruding from said liner sleeve; and
    actuator means for applying a pulling force to said grip means, said pulling force initially drawing said nose piece toward the substrate for deforming and locking the liner sleeve within the substrate opening, said pulling force thereafter over-riding said clutch unit to shift said inner housing from said advanced position to said retracted position and thereby shift said outer housing leading end into bearing engagement with the substrate while retracting said nose piece relative to said substrate.

2. The installation tool of claim 1 wherein said actuator means includes reset means for resetting said inner housing in said advanced position.

3. The installation tool of claim 1 wherein said nose piece has a tapered geometry for engaging and flaring a leading end of the liner sleeve to deform and lock the liner sleeve within the substrate opening.

4. The installation tool of claim 1 wherein said nose piece is configured to bear against the substrate while said pulling force draws a fixture pin head at least partially through the liner sleeve to deform and lock the liner sleeve within the substrate opening.

5. The installation tool of claim 1 wherein the fixture pin includes a collapsible head and said elongated mandrel, said pulling force initially drawing said nose piece toward the substrate for deforming and locking the liner sleeve within the substrate opening, and for thereafter causing the fixture pin head to collapse for pull-removal from the liner sleeve.

6. The installation tool of claim 1 wherein said clutch unit comprises at least one lock ball biased by a clutch spring for normally engaging and retaining said inner housing in said advanced position, said clutch spring permitting disengagement of said at least one lock ball from said inner housing in response to said pulling force of a predetermined magnitude.

7. The installation tool of claim 1 wherein said clutch unit includes a clutch spring for retaining said inner housing in said advanced position in response to said pulling force having a magnitude sufficient to deform the liner sleeve but less than a predetermined value, and permitting shifting of said inner housing to said retracted position when said pulling force exceeds said predetermined value.

8. The installation tool of claim 1 wherein said nose piece is removably mounted onto said inner housing.

9. The installation tool of claim 1 wherein said grip means comprises a pair of separable grip jaws, and a spring member for normally urging said grip jaws to a slidably advanced position within said inner housing, and further wherein said grip jaws and said inner housing include cooperating cam surfaces for spreading said grip means sufficiently to release the fixture pin mandrel when said grip jaws are in said advanced position, said actuator means applying said pulling force to said grip jaws for at least slightly retracting said grip jaws relative to said inner housing whereby said grip jaws grip and retain the fixture pin mandrel.

10. In combination:
- a liner sleeve attachment including a deformable liner sleeve for secure mounting within a substrate opening, and a fixture pin having a collapsible head carried by said liner sleeve and an elongated mandrel protruding from said head; and
- an installation tool including an outer housing defining a leading end, and an inner housing slidably movable within said outer housing between an advanced position with a nose piece thereon advanced beyond said outer housing leading end, and a retracted position with said nose piece thereon retracted relative to said outer housing leading end;
- said tool further including a clutch unit normally retaining said inner housing in said advanced position, grip means carried by said inner housing for engaging said fixture pin mandrel, and actuator means for applying a pulling force to said grip means;
- said pulling force initially drawing said nose piece toward the substrate for deforming and locking said liner sleeve within the substrate opening;
- said pulling force thereafter over-riding said clutch unit to shift said inner housing from said advanced position to said retracted position and thereby shift said outer housing leading end into bearing engagement with the substrate while retracting said nose piece relative to said substrate, and to cause said fixture pin head to collapse for pull-removal of said fixture pin from said liner sleeve.

11. The combination of claim 10 wherein said actuator means includes reset means for resetting said inner housing in said advanced position.

12. The combination of claim 10 wherein said nose piece has a tapered geometry for engaging and flaring a leading end of the liner sleeve to deform and lock the liner sleeve within the substrate opening.

13. The combination of claim 10 wherein said nose piece is configured to bear against the substrate while said pulling force draws a fixture pin head at least partially through the liner sleeve to deform and lock the liner sleeve within the substrate opening.

14. The combination of claim 10 wherein said clutch unit comprises at least one lock ball biased by a clutch spring for normally engaging and retaining said inner housing in said advanced position, said clutch spring permitting disengagement of said at least one lock ball from said inner housing in response to said pulling force of a predetermined magnitude.

15. The combination of claim 10 wherein said clutch unit includes a clutch spring for retaining said inner housing in said advanced position in response to said pulling force having a magnitude sufficient to deform the liner sleeve but less than a predetermined value, and permitting shifting of said inner housing to said retracted position when said pulling force exceeds said predetermined value sufficient to cause said fixture pin head to collapse.

16. The combination of claim 10 wherein said nose piece is removably mounted onto said inner housing.

17. The installation tool of claim 10 wherein said grip means comprises a pair of separable grip jaws, and a spring member for normally urging said grip jaws to a slidably advanced position within said inner housing, and further wherein said grip jaws and said inner housing include cooperating cam surfaces for spreading said grip means sufficiently to release the fixture pin mandrel when said grip jaws are in said advanced position, said actuator means applying said pulling force to said grip jaws for at least slightly retracting said grip jaws relative to said inner housing whereby said grip jaws grip and retain the fixture pin mandrel.

18. The combination of claim 10 wherein said liner sleeve attachment further includes a nutplate in general alignment with a blind side of the substrate opening, said fixture pin mandrel protruding from said liner sleeve at least a short distance beyond a front side of said substrate.

* * * * *